United States Patent
Li et al.

(10) Patent No.: US 12,058,039 B2
(45) Date of Patent: Aug. 6, 2024

(54) PACKET VALIDITY TIME ENHANCEMENT FOR QUALITY OF SERVICE FLOWS

(71) Applicant: NOKIA TECHNOLOGIES OY, Espoo (FI)

(72) Inventors: Zexian Li, Espoo (FI); Stefano Paris, Vanves (FR); Kalle Petteri Kela, Kaarina (FI); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/739,015

(22) Filed: May 6, 2022

(65) Prior Publication Data

US 2023/0362090 A1    Nov. 9, 2023

(51) Int. Cl.
*H04L 45/00* (2022.01)
*H04L 45/121* (2022.01)

(52) U.S. Cl.
CPC ............ *H04L 45/38* (2013.01); *H04L 45/121* (2013.01); *H04L 45/22* (2013.01)

(58) Field of Classification Search
CPC ........ H04L 45/38; H04L 45/22; H04L 45/121
(Continued)

(56) References Cited

U.S. PATENT DOCUMENTS

2009/0219937 A1* 9/2009 Liu ................. H04L 47/2416
370/392
2017/0359749 A1   12/2017 Dao
(Continued)

FOREIGN PATENT DOCUMENTS

EP        3 855 804 A1    7/2021
WO    WO-2019068328 A1 * 4/2019 ............. H04L 45/24
(Continued)

OTHER PUBLICATIONS

5G New Radio Fronthaul Network Design for eCPRI-IEEE 802. 1CM and Extreme Latency Percentiles Gabriel Otero Pérez; David Larrabeiti López; José Alberto Hernández IEEE Access Year: 2019 | vol. 7 | Journal Article | Publisher: IEEE (Year: 2019).*

(Continued)

*Primary Examiner* — Ranodhi Serrao
(74) *Attorney, Agent, or Firm* — SQUIRE PATTON BOGGS (US) LLP

(57) ABSTRACT

Methods and apparatuses for enhancement of quality of service flows, for extended reality services or other services are proposed. For example, a method can include receiving a plurality of quality of service parameters for first packet-based communication. The quality of service parameters can include a packet delay budget for the first packet-based communication having a first end time. The plurality of quality of service parameters can further include a packet validity time for the first packet-based communication having a second end time equal to or later than the first end time. The packet validity time can be applicable to the first packet-based communication on a protocol data unit session basis, a quality of service flow basis, a set of protocol data units basis, or a packet basis. The method can also include transmitting the packet of the first packet-based communication to a further communication device.

19 Claims, 10 Drawing Sheets

(58) Field of Classification Search
USPC .......................................................... 709/238
See application file for complete search history.

(56) References Cited

U.S. PATENT DOCUMENTS

2022/0182185 A1* 6/2022 Bostrom ............... H04L 1/1671
2022/0217089 A1* 7/2022 Liu ....................... H04L 43/106

FOREIGN PATENT DOCUMENTS

WO 2022/046387 A1 3/2022
WO 2022/084483 A1 4/2022

OTHER PUBLICATIONS

3GPP TS 23.501 V17.4.0 (Mar. 2022), Technical Specification, 3rd Generation Partnership Project; Technical Specification Group Services and System Aspects; System architecture for the 5G System (5GS); Stage 2 (Release 17), Mar. 2022.
3GPP TS 23.502 V17.4.0 (Mar. 2022), Technical Specification, 3rd Generation Partnership Project; Technical Specification Group Services and System Aspects; Procedures for the 5G System (5GS); Stage 2 (Release 17), Mar. 2022.
3GPP TS 38.321 V17.0.0 (Mar. 2022), Technical Specification, 3rd Generation Partnership Project; Technical Specification Group Radio Access Network; NR; Medium Access Control (MAC) protocol specification (Release 17), Mar. 2022.
3GPP TR 26.928 V17.0.0 (Apr. 2022), Technical Report, 3rd Generation Partnership Project; Technical Specification Group Services and System Aspects; Extended Reality (XR) in 5G (Release 17), Apr. 2022.
3GPP TR 22.842 V17.2.0 (Dec. 2019), Technical Report, 3rd Generation Partnership Project; Technical Specification Group Services and System Aspects; Study on Network Controlled Interactive Services (Release 17), Dec. 2019.
3GPP TS 22.104 V18.3.0 (Dec. 2021), Technical Specification, 3rd Generation Partnership Project; Technical Specification Group Services and System Aspects; Service requirements for cyber-physical control applications in vertical domains; Stage 1 (Release 18), Dec. 2021.
3GPP TS 22.261 V18.6.0 (Mar. 2022), Technical Specification, 3rd Generation Partnership Project; Technical Specification Group Services and System Aspects; Service requirements for the 5G system; Stage 1 (Release 18), Mar. 2022.
China Mobile et al., "New SID on Study on architecture enhancement for XR and media services," SP-211646, TSG SA Meeting #SP-94E, Dec. 14-20, 2021, Electronic Meeting.
Nokia, "New SID "Study on XR Enhancements for NR"," RP-213587, 3GPP TSG RAN Meeting #94e, Electronic Meeting, Dec. 6-17, 2021.
VIVO, "Discussion on RAN enhancement to support survival time", 3GPP TSG-RAN WG2 Meeting #113 Electronic E-Meeting, Jan. 25-Feb. 5, 2021, R2-2100831, 4 pages.
CATT, "Handling of Survival Time", 3GPP TSG-RAN WG2 Meeting #113bis-e, Online Apr. 12-20, 2021, R2-2102726, 7 pages.
3GPP TR 23.700-60 V0.2.0 (Apr. 2022), Technical Report, 3rd Generation Partnership Project; Technical Specification Group Services and System Aspects; Study on XR (Extended Reality) and media services (Release 18), 131 pages.
European Extended Search Report issued in corresponding European Patent Application No. 23171270.4—1213/4274189 on Oct. 23, 2023.

* cited by examiner

| SQI Value | Resource Type | Default Priority Level | Packet Delay Budget (NOTE 3) | Validity time | Packet Error Rate | Default Maximum Data Burst Volume (NOTE 2) | Default Averaging Window | Example Services |
|---|---|---|---|---|---|---|---|---|
| 80 | | 68 | 10 ms (NOTE 5, NOTE 10) | 5 ms | $10^{-6}$ | N/A | N/A | Low Latency eMBB applications Augmented Reality |
| 88 | Delay-critical GBR | 25 | 10 ms (NOTE 4) | N/A | $10^{-3}$ | 1125 bytes | 2000 ms | Interactive Service - Motion tracking data |
| 89 | | 25 | 15 ms (NOTE 4) (DL) | 10ms | $10^{-4}$ | 17000 bytes | 2000 ms | Visual content for cloud/edge/split rendering |
| 90 | | 25 | 20 ms (NOTE 4) (UL) | 20ms | $10^{-4}$ | 63000 bytes | 2000 ms | Visual content for cloud/edge/split rendering |

FIG. 4

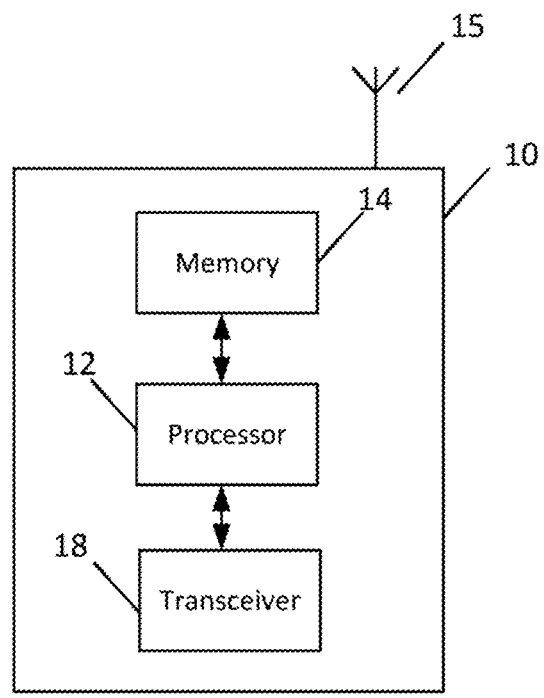
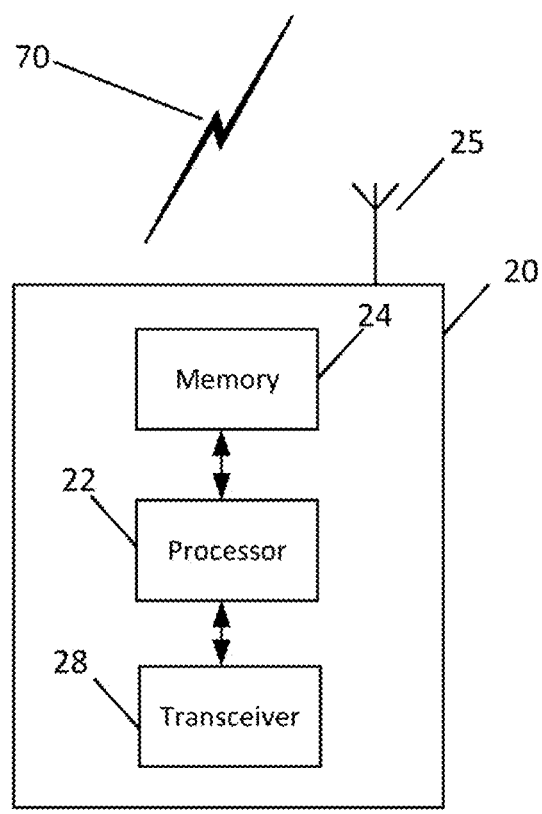
FIG. 11

PACKET VALIDITY TIME ENHANCEMENT FOR QUALITY OF SERVICE FLOWS

FIELD

Some example embodiments of the present disclosure may generally relate to communications, and in particular to mobile or wireless telecommunication systems, such as Long Term Evolution (LTE), fifth generation (5G) or new radio (NR) telecommunication systems, or other telecommunications systems. For example, certain example embodiments of the present disclosure may generally relate to systems and/or methods for enhancement of quality of service flows, for extended reality services or other services.

BACKGROUND

Examples of mobile or wireless telecommunication systems may include a Universal Mobile Telecommunications System (UMTS), a Long Term Evolution (LTE) telecommunication system, a LTE-Advanced (LTE-A) telecommunication system, a LTE-A Pro telecommunication system, and/or a fifth generation (5G) or new radio (NR) telecommunication system. 5G telecommunication systems refer to the next generation (NG) of radio access networks and a network architecture for the core network. A 5G telecommunication system is mostly built on a 5G new radio (NR), but a 5G telecommunication system can also built on other radio access technologies, such as LTE. It is estimated that 5G NR provides bitrates on the order of 10-20 Gbit/s or higher, and can support at least service categories such as enhanced mobile broadband (eMBB) and ultra-reliable low-latency-communications (URLLC) as well as massive machine type communication (mMTC). 5G NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G NR, which can provide both 5G NR and LTE (and LTE-Advanced) radio access. It is noted that, in a NG-RAN, radio access nodes that can provide radio access functionality to a user equipment (i.e., similar to the Node B, NB, in a UTRAN or the evolved NB, eNB, in LTE) may be named next-generation NB (gNB) when built on 5G NR and may be named next-generation eNB (NG-eNB) when built on E-UTRA.

SUMMARY

An embodiment of the present disclosure may be directed to an apparatus. The apparatus can include at least one processor and at least one memory comprising computer program code. The at least one memory and computer program code can be configured, with the at least one processor, to cause the apparatus at least to perform configuring a network node with a plurality of quality of service parameters for first packet-based communication. The plurality of quality of service parameters can include a packet delay budget for the first packet-based communication having a first end time and a packet validity time for the first packet-based communication having a second end time. The packet validity time can be applicable to the first packet-based communication on a protocol data unit session basis, a quality of service flow basis, a set of protocol data units basis, or a packet basis. The second end time can be equal to or later than the first end time.

An embodiment of the present disclosure may be directed to an apparatus. The apparatus can include at least one processor and at least one memory comprising computer program code. The at least one memory and computer program code can be configured, with the at least one processor, to cause the apparatus at least to perform receiving a plurality of quality of service parameters for first packet-based communication. The quality of service parameters can include a packet delay budget for the first packet-based communication having a first end time. The plurality of quality of service parameters can further include a packet validity time for the first packet-based communication having a second end time. The packet validity time can be applicable to the first packet-based communication on a protocol data unit session basis, a quality of service flow basis, a set of protocol data units basis, or a packet basis. The second end time can be equal to or later than the first end time. The at least one memory and computer program code can also be configured, with the at least one processor, to cause the apparatus at least to perform transmitting the packet of the first packet-based communication to a further communication device.

An embodiment of the present disclosure may be directed to a method. The method can include configuring a network node with a plurality of quality of service parameters for first packet-based communication. The plurality of quality of service parameters can include a packet delay budget for the first packet-based communication having a first end time and a packet validity time for the first packet-based communication having a second end time. The packet validity time can be applicable to the first packet-based communication on a protocol data unit session basis, a quality of service flow basis, a set of protocol data units basis, or a packet basis. The second end time can be equal to or later than the first end time.

An embodiment of the present disclosure may be directed to a method. The method can include receiving a plurality of quality of service parameters for first packet-based communication. The quality of service parameters can include a packet delay budget for the first packet-based communication having a first end time. The plurality of quality of service parameters can further include a packet validity time for the first packet-based communication having a second end time. The packet validity time can be applicable to the first packet-based communication on a protocol data unit session basis, a quality of service flow basis, a set of protocol data units basis, or a packet basis. The second end time can be equal to or later than the first end time. The method can also include transmitting the packet of the first packet-based communication to a further communication device.

An embodiment of the present disclosure may be directed to an apparatus. The apparatus can include means for configuring a network node with a plurality of quality of service parameters for first packet-based communication. The plurality of quality of service parameters can include a packet delay budget for the first packet-based communication having a first end time and a packet validity time for the first packet-based communication having a second end time. The packet validity time can be applicable to the first packet-based communication on a protocol data unit session basis, a quality of service flow basis, a set of protocol data units basis, or a packet basis. The second end time can be equal to or later than the first end time.

An embodiment of the present disclosure may be directed to an apparatus. The apparatus can include means for receiving a plurality of quality of service parameters for first packet-based communication. The quality of service parameters can include a packet delay budget for the first packet-based communication having a first end time. The plurality of quality of service parameters can further include a packet validity time for the first packet-based communication having a second end time. The packet validity time can be applicable to the first packet-based communication on a protocol data unit session basis, a quality of service flow basis, a set of protocol data units basis, or a packet basis. The second end time can be equal to or later than the first end time. The apparatus can also include means for transmitting the packet of the first packet-based communication to a further communication device.

BRIEF DESCRIPTION OF THE DRAWINGS

For proper understanding of example embodiments, reference should be made to the accompanying drawings, wherein:

FIG. 4 illustrates a way of defining validity time for each fifth generation quality indicator, according to certain embodiments;

FIG. 11 illustrates an example block diagram of a mobile or wireless telecommunication system, according to an embodiment.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enhancement of quality of service flows, for extended reality services or other services, is not intended to limit the scope of certain embodiments but is representative of selected example embodiments.

The features, structures, or characteristics of example embodiments described throughout this specification may be combined in any suitable manner in one or more example embodiments. For example, the usages of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

As described in third generation partnership project (3GPP) technical report (TR) 26.928, XR can refer to all real-and-virtual combined environments and associated human-machine interactions generated by computer technology and wearable computing devices. XR is an umbrella term for different types of realities and typical use cases and includes for example augmented reality (AR), mixed reliability (MR), virtual reality (VR), cloud gaming and so on.

XR and Cloud Gaming (CG) may be example use cases and services for new radio (NR) in release 18 (Rel-18) and beyond.

Figure 1A:
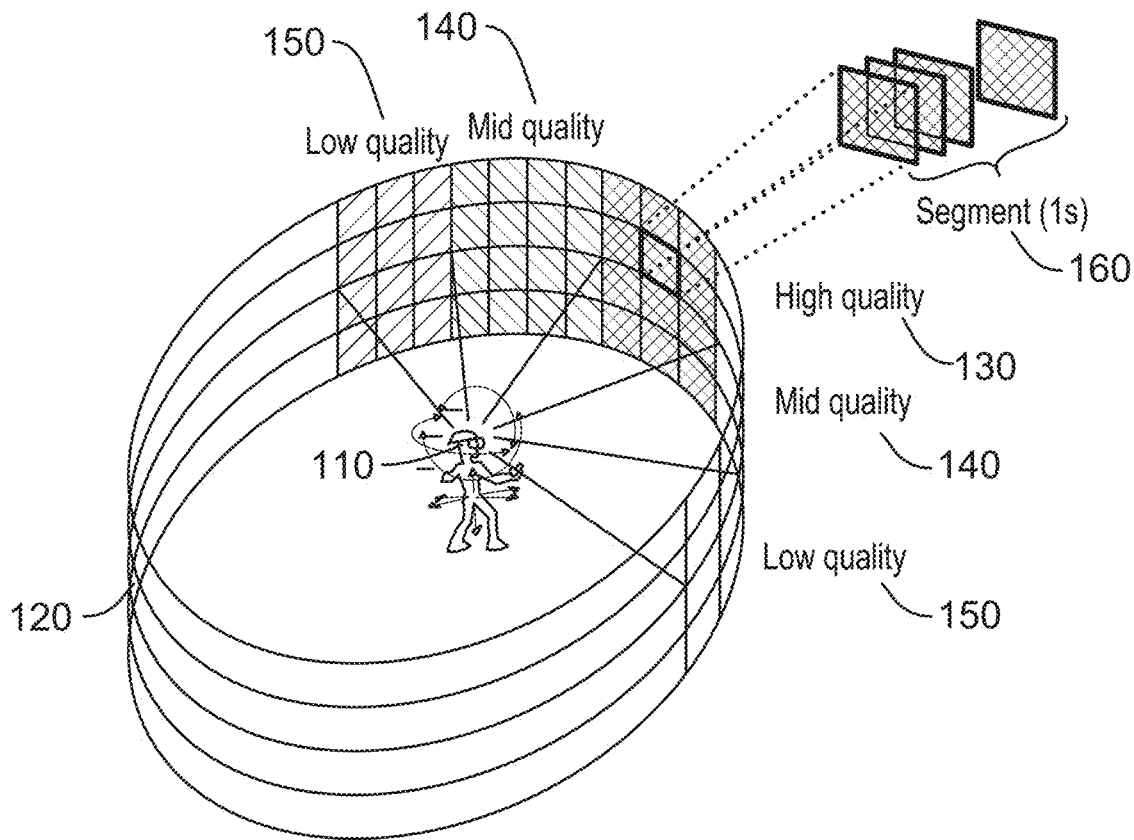
FIG. 1A illustrates a representation of three-dimensional media content in viewport-dependent streaming, in which video is sent only in a field of view.

One concern for XR services is the transmission of high-quality 3D media content, such as a 3D video, with low latency, from a server hosting a XR application ("XR application server") to a user equipment of an end user of the XR service via a radio access node of a radio access network. The 3D video may originate at the XR application server, at streaming video service provider's server, or at the user equipment of an end user. Although the 3D video may readily traverse the network, the biggest obstacle to communication may be a wireless link between the user equipment of an end user and the radio access network node. Due to the large volume of data used to represent 3D media content, a variety of different compression algorithms have been developed to compress 3D video prior to transmission to user equipment via a network. FIG. 1A illustrates a representation of three-dimensional (3D) media content, which may be typical of an extended reality (XR) service provided to a user equipment via a network. For XR services, viewport-dependent streaming of the 3D video may be implemented based on adaptive streaming schemes. The adaptive streaming schemes may take into account status of the network, including status of the RAN, and pose/six degrees of freedom (6DoF) movement, position, and/or acceleration information to adjust the quality of the video to the available bitrate and user field of view (FoV). In certain cases, the XR application server may have a full, high-quality, 3D video of the omnidirectional 3D scene available. Viewport-dependent streaming refers to streaming (i.e., transmitting) only 3D video for a portion of the omnidirectional 3D scene that is currently viewable by the end user. For example, as shown in FIG. 1A, although video is available in all directions around a viewer, because humans can only see in about a 120 degree arc at a given time, viewport-dependent streaming can stream video in dependence on the viewing direction, or viewport, of the user. Moreover, the wearable device user equipment 110 may have a screen with an arc of about 120 degrees. Thus, even though video 120 corresponding to angles behind the end user (e.g. the viewer's) head may be available at the XR application server, the viewer cannot benefit from having this video rendered in the omnidirectional 3D scene available.

In viewport-dependent streaming, the omnidirectional 3D scene can be spatially divided, with respect to an anchor point, such as the position and orientation of the end user (e.g. the viewer or the observer), into independent subpictures or tiles. Thus, as shown in FIG. 1A, there can be a high quality segment 130 of the video that is streamed (for example, transmitted) by the XR application server (for example, segments of the video with frames having the highest resolution), medium quality segments 140 that can be streamed (for example, transmitted) by the XR application server (for example, segments of the video with frames having medium resolution), and low quality segments 150 that can be streamed (for example, transmitted) by the XR application server (for example, segments of the video with frames having low resolution). Each of these segments can include multiple tiles 160, which are illustrated as squares, but could be any shape. In each tile 160, the 3D content can be further split into a sequence of segments, where each segment can represent a certain duration of the 3D video to be streamed (for example, transmitted) to an end user, such as a person wearing user equipment (UE) 110, such as 1 second of 3D video. The XR application server (otherwise referred to as a streaming server) can offer multiple representations of the same tile by storing segments of each tile at different qualities by varying video parameters like resolution, compression, and frame rate. To minimize the bitrate of the streamed (for example, transmitted) 3D video stream, an XR client in the UE can request tiles at different qualities according to their position in the user FoV. Tiles in the narrow FoV, mid FoV, and far peripheral FoV can be downloaded at decreasing quality as illustrated in FIG. 1A. The perceived quality of the 3D scene may not be significantly affected by the tiles displayed on the edge of the end user's gaze. An XR application server (for example, streaming server) is any type of computing system that is connected to a network and streams (for example, transmits) media content to a user equipment of an end user of a media service provided by the streaming server. A streaming server can be any type of computing system that is connected to a user plane function of a core network of a 5G system.

Figure 1B:
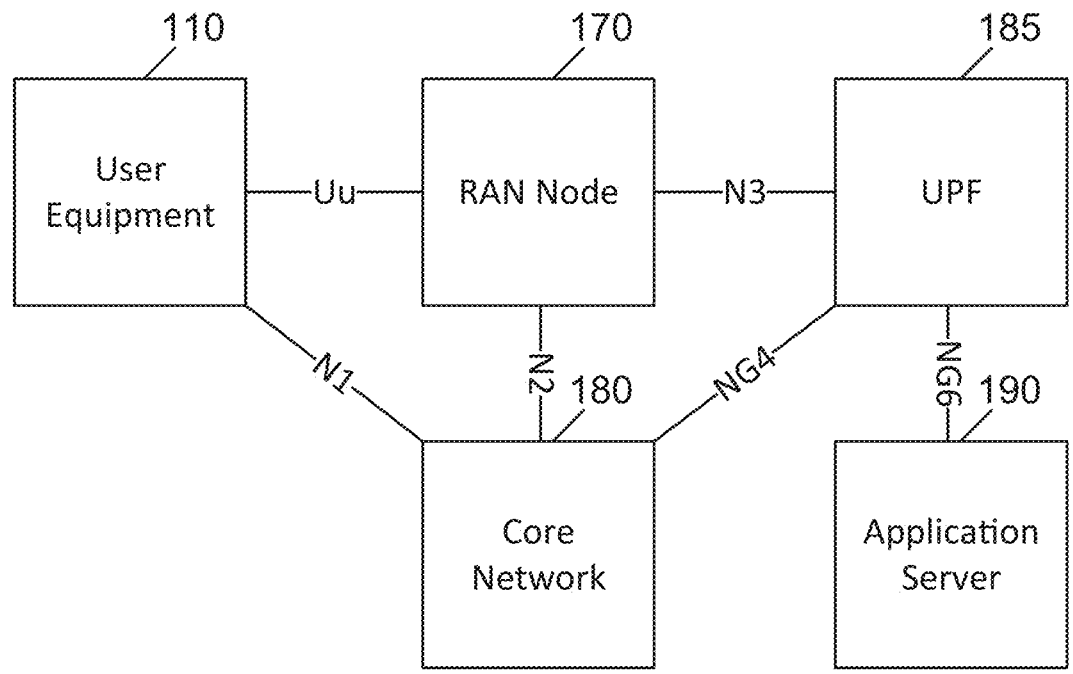
FIG. 1B illustrates a network diagram over which media content can be provided.

FIG. 1B illustrates a block diagram of a network through which media content can be provided from an XR application server (e.g., a streaming server) to the user equipment of an end user. The user equipment 110 can be the same wearable device in FIG. 1A. UE 110 can be connected to a radio access network (RAN) node 170, such as an evolved Node B (eNB) or next generation node B (gNB) of a radio access network (RAN) over an interface Uu. The UE 110 and RAN node 170 may have their communication controlled by core network functions of a core network 180 such as an Access and Mobility Management Function (AMF), a session mobility function (SMF), or by a mobility management entity (MME). The RAN node 170 may communicate with over an interface N3 to UPF 185, which in turn in can be in communication with application server 190 over interface NG6. The core network 180 may be in communication with the UPF 185 over interface NG4. Many intermediate devices are omitted from this illustration for clarity, and devices that are shown as separate may be implemented in a single physical device, for example the UPF 185 may be implemented in the RAN node 170. The Uu interface may be the most limited interface from the standpoint of data transmission. Thus, it may be valuable to implement compression of data that will be provided over the Uu interface.

Compression of data representing video content ("video compression") can be achieved through differential encoding, in which the video content can be divided into reference media units and non-reference media units. The reference media units may be decompressed without reference to other media units. By contrast, non-reference media units may be decompressed only with reference to other media units. For example, compression of frames in each segment of each tile of the 3D video shown in FIG. 1A may be achieved through a mix of intra-frame and inter-frame coding. Intra-frame coding can use lossy encoding techniques to generate frames that require only the information carried in the compressed frame for decompressing the compressed frame. In contrast, inter-frame encoding can apply differential techniques on multiple frames of the 3D video (e.g. frames of a segment of a tile of the 3D video) to encode and transmit only the differences across consecutive frames of the 3D video (e.g., frames of the segment of the tile of the 3D video). Frames generated using intra-frame encoding can be referred to as called reference media units or I-frames, while those generated using inter-frame coding are called non-reference media units or P-frames or B-frames, depending on the differential encoding technique used to compress the frames. Inter-frame encoding may achieve higher compression at the cost of creating dependencies across frames of the 3D video (e.g. frames of a segment of a tile of a 3D video). To limit the long dependencies and increase reliability against transmission losses, frames of the 3D video (e.g., frames of a segment of a tile of a 3D video) can be organized into a group of pictures (GoP), namely a sequence of consecutive frames starting with a reference media unit or I-frame followed by a certain number of non-reference media units or P-frames and/or B-frames.

The outcome of the video compression of 3D video can include three frame types: I, P and B. I-frames, also known as intra-coded picture frames, can be generated based only on a single captured image of a frame of the 3D video. The achievable compression of the 3D video may be the lowest across the three frame types, but this type of frame is standalone, in that it does not require other video frames for decoding. On the other hand, this type of frame can be used by other video frames for decoding, and thus may be referred to as a reference frame or reference media unit.

P-frames, also known as predicted picture frames, can be generated using only the changes of the image with respect to the previous frame. P-frames can achieve a higher compression ratio than I-frames, but may require previous frames for the decoding. B-frames, also known as bidirectional predicted picture frames, can use both previous and future frames as data reference for computing the changes that are encoded. B-frame can achieve the highest amount of data compression but can create dependencies with both past and future frames.

Figure 2:
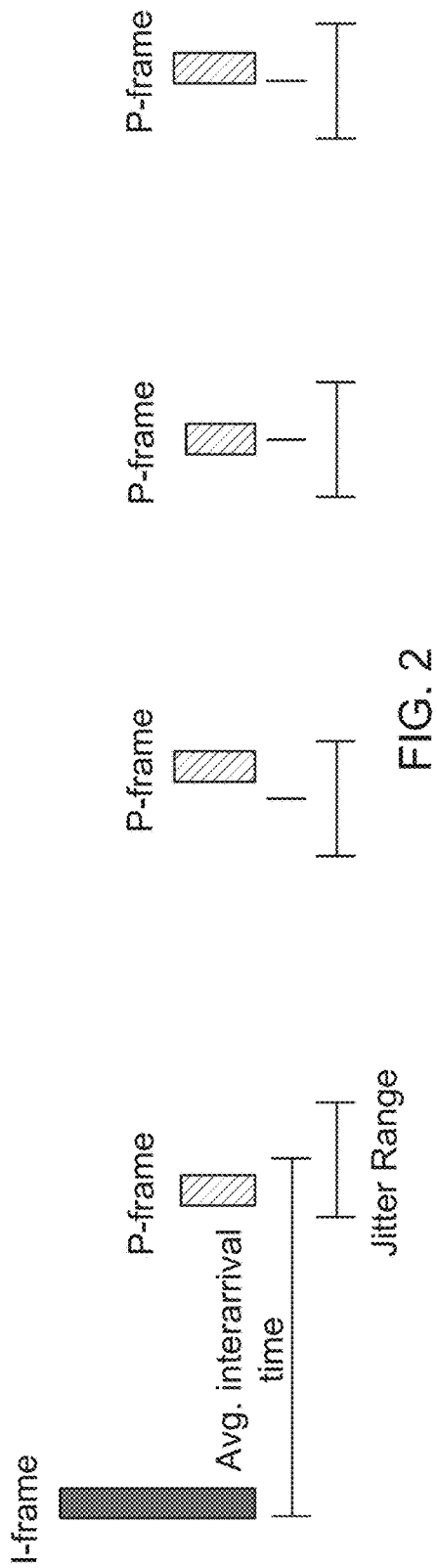
FIG. 2 illustrates an example traffic pattern of an extended reality video.

In XR services, B-frames may be avoided to further limit dependencies across frames and speed up the process of decompressing the compressed frames at a receiver. As mentioned above, a GoP can include a sequence of consecutive frames starting with a reference media unit, for example an I-frame, followed by a certain number of non-reference media units, for example P-frames and/or B-frames. The GoP organization of the 3D video stream can create a bursty traffic pattern with a large burst due to the first I-frame of the GoP followed by a sequence of smaller bursts carrying P-frames as illustrated in FIG. 2, which illustrates an example traffic pattern of an extended reality video stream. This traffic pattern can be characterized as bursty rather than continuous, because the reference media unit may be a larger amount of data than the non-reference media units that follow and both the reference and non-reference media units may be fragmented into multiple network-layer packets.

As shown in FIG. 2, two types of media unit can be generated by an XR application running an XR service on a streaming server or a UE. This approach can be referred to as supporting multimodality. A first mode can be the transmission of the reference media units and the second mode can be the transmission of the non-reference media units.

Certain embodiments may be implemented in any case where an application uses differential encoding techniques to reduce the bitrate of the stream that the application generates. Examples may include not only applications to provide XR services, but also applications requiring URLLC, such as sharing surveillance data in a vehicle to everything (V2X) implementation or sharing data in an industrial internet of things (IoT) implementation. When differential encoding is used, the sender can generate reference media units and non-reference media units. The content of a reference media unit can be decoded by the receiver using only the information contained in the reference media unit itself. By contrast, a non-reference frame can be generated by encoding a function of the differences among previous reference and possibly non-reference media units. Therefore, the content of a non-reference media unit can be decoded by the receiver only if all media units that have been used to generate the content of the non-reference media unit have been successfully received.

To limit the propagation of errors of a reference media unit indefinitely, the sender can periodically generate a reference media unit. For example, if an application server is generating the reference media units for transmission to a user equipment, then the application server may be the sender in this instance, even though the RAN node may be the node responsible for delivering the reference media units to the UE over an air interface. As another option, if the user equipment is generating the reference media units for transmission over the network to a remote device, such as another user equipment, then in this example the user equipment may be the sender and the radio access network node may be considered the receiver. The periodically generated reference media unit can refresh the dependency of future non-reference media units and can break the propagation of an error. The GoP pattern that defines the sequence and number of reference and non-reference media units can be decided by the sender and shared with the receiver. This pattern can always start with a reference media unit and can repeat over time. The pattern can be updated by the sender according to system and network status. For example, when the sender is an application server, the sender can take into account the status of the application server, such as the ability of the application server to send more or fewer reference media units, such as reference media units.

An example of an application that can use differential encoding techniques is video encoding used in XR applications. In this example, an I-frame can serve as a reference media unit because the I-frame content can be recovered from the I-frame itself, while a P-frame can be a non-reference media unit since the P-frame content can be generated by encoding only the difference from the previous I-frame and possibly other P-frames. Frames can be grouped in group of pictures (GoP), which defines the sequence of I-frames and P-frames. An example of GoP is "IPPPPIPP" indicating that the sequence generated by the sender can be composed of 8 frames, starting with an I-frame followed by 4 P-frames, 1 I-frame and other 2 P-frames. This GoP can repeat over time until the sender changes it.

Although I-/P-frame are provided in the following discussions as an example, reference media unit and non-reference media unit can be more general, with I-/P-/B-frames as examples. In this discussion, a reference media unit may have no dependency on other media units, while decoding of a non-reference media unit can be dependent on a previous reference media unit and possibly non-reference media units.

There may be various aspects to support of XR services in fifth generation (5G) at a RAN node (for example, a next generation Node B (gNB)). For example, support of XR services may include provision of media unit type information such as reference media unit/I-frame or non-reference media unit/P-frame. Media unit type information may be information that identifies what kind of frame is included in a particular packet.

For example, a session management function (SMF), application function (AF), or other core network (CN) function (otherwise referred to as a core network entity) may inform the next generation (NG) radio access network (RAN) about the GoP pattern, in a similar way as for time sensitive communication assistance information (TSCAI). For example, the information provided can include XR frame periodicity, I-/P-frame pattern, or the like. Such communication about the GoP pattern may occur, for example, over interface N2 in FIG. 1B.

As another option, a RAN node (e.g. a gNB) can learn the GoP pattern by itself. For example in downlink (DL), assuming a protocol data unit (PDU) session is established for traffic of an XR application only, based on a characteristic such as packet size, the gNB can learn the GoP pattern, at least whether the frame is I-frame or P-frame. In uplink (UL), such information could be learned from UE and reported by UE. As another option, with a local application server that uses two user datagram protocol (UDP) connections separately for I-frames and P-frames. This can enable the gNB to recognize I-frame and P-frame using UDP port. This may be a reasonable assumption for AR services with split-rendering, where the rendering may be performed at an edge server.

Thus, there are multiple ways by which the frame type information may be available at the gNB.

Within a 5G system (5GS), a quality of service (QoS) flow may be the finest granularity of QoS differentiation in a PDU session. Considering mapping of packets comprising frames of a video, such as frames of a segment of a tile of a 3D video, into a QoS flow, depending on the deployment and operator preference, there can be at least two cases: packets comprising reference media units and packets comprising non-reference media units may be mapped to the same QoS flow of a PDU session, or packets comprising reference media units and packets comprising non-reference media units may be mapped to different QoS flows of a PDU session.

Each QoS flow can be controlled by the session management function (SMF) of the core network 180 and may be preconfigured or established during establishment of a PDU session, as described in clause 4.3.2 of 3GPP technical specification (TS) 23.502. For each QoS flow, there can be a corresponding QoS profile (otherwise referred to as a QoS configuration) provided by SMF to the access network (AN). Each QoS profile can have one corresponding QoS flow identifier (QFI). The QoS profile of a QoS flow can be sent to the RAN. The QoS can contain different QoS parameters, as described in clause 5.7 of 3GPP TS 23.501, including a QoS identifier, such as a 5QI. A QoS identifier, such as a 5QI, can be a scalar that can be used as a reference to 5G QoS characteristics defined in clause 5.7.4 of TS 23.501. Examples may include access node-specific parameters that control QoS forwarding treatment for the QoS flow, such as scheduling weights, admission thresholds, queue management thresholds, link layer protocol configuration, and the like.

One of the QoS parameters can be packet delay budget (PDB). PDB can define an upper bound for the time that a packet may be delayed between the UE and the N6 termination point at the user plane function (UPF), as described in 3GPP TS 23.501. The PDB applies to a DL packet received by the UPF over the N6 interface, and to the UL packet sent by the UE to a RAN node of the RAN (e.g., 5G AN). The PDB can be used to support the configuration of scheduling and link layer functions, such as the setting of scheduling priority weights and hybrid automatic repeat request (HARQ) target operating points. Scheduling here can refer to scheduling packets for delivery over the Uu interface shown in FIG. 1B. Link layer functions can include handling transmission errors and regulating data flow. Target operating points can refer to desired ways in which the network and the network's elements operate. The 5G access network (5G-AN) PDB can be determined by subtracting from a given PDB a static value for the core network (CN) PDB, which static value can represent the delay between any N6 termination point at the UPF for any UPF that may possibly be selected for the PDU Session, and the 5G-AN.

The 5G-AN PDB can be used by a RAN node (e.g., a gNB) at least for the purpose of optimized scheduling operation. For example, the PDB may be used to decide which packets are transmitted before other packets. This can apply to all different applications including XR and ultra-reliable low-latency communications (URLLC) for example.

In the case of XR services, all packets comprising I-frames or P-frames may have a same QoS parameter, PDB. Thus, a RAN node (e.g. a gNB) may be trying to successfully transmit a packet comprising a frame within a time window of the PDB. In case that a packet comprising a frame cannot be successfully transmitted by the RAN node (i.e. delivered to the UE by the RAN node) within the PDB, the RAN may deliver the packet late or drop the packet. Accordingly, it will be up to an operator of the RAN to implement determine that the packet may be dropped since the RAN may not be sure that the packet is still useful. Moreover, the dropping the packet can save resources of the RAN, which can be used for other transmissions.

Dropping a packet beyond PDB works well for most cases where PDB is used. However, with certain cases including XR services, dropping some packets may cause issues. As mentioned above, P-frames may carry only the difference with respect to a previous I-frame. Thus, when an I-frame is lost, all consecutive P-frames until the next I-frame may become useless since they are not self-decodable. As explained above the P-frames may need the I-frame in order for the P-frame to be decoded and rendered to the end user.

In another word, if an I-frame is dropped after PDB, all the consecutive P-frames afterwards in the same segment, before the next I-frame, may become useless since they are not self-decodable. When a single segment in a single tile of the 3D scene cannot be successfully decoded due to the loss of an I-frame, a large portion of the whole 3D scene may not be displayable, because adjacent tiles may not be correctly rendered. Therefore, the loss of an I-frame in a single tile can potentially affect all surrounding tiles and potentially an entire 3D scene.

Similarly, dropping the packet might not be the optimal resolution for some URLLC services either, since differential coding techniques can be used to decrease the average bitrate of applications using URLLC services.

Certain embodiments may allow the gNB to avoid dropping the packet right after the PDB window, at least in certain cases. For example, certain embodiments may provide efficient support of various services with 5G. For example, certain embodiments may rely on a QoS parameter of packet validity time. In certain embodiments, even after PDB, a transmitter may still send a packet, such as an I-frame, within the validity time window.

Taking the example of XR application, during the validity time window, the I-frame can still be used to help decoding the following P-frames. In this way, not all P-frames that follow an I-frame that could not be transmitted within the I-frame's PDB become useless. End user experience may be improved.

On top of PDB, a new QoS parameter, validity time, can be provided for one QoS flow. Considering XR type of traffic, there can be a case where the I-frame and P-frame are mapped to different QoS flows. Different values for the QoS parameter can be included for the QoS flows of I-frame and P-frame, respectively. Such new QoS parameter and corresponding values for different frame types can be specified, for example in 3GPP TS 23.501.

In case I-frame and P-frame are mapped onto the same QoS flow, the validity time can be defined for the service flow. However, from RAN side, for processing I-/P-frame, gNB behavior may be different because the validity time offers higher benefits for I-frame and validity time may be used for P-frame packet only if previous I-frame has been delivered. As another option, the validity time can be applied at a packet level. For example the validity time may only apply to the packets carrying I-frame data traffic.

Independently from the option, the behavior for the use of the validity time may depend on the priority of the XR packet. For example, the I-frame may have higher priority than P-frame in a case with video traffic. If the I-frame is delivered correctly, then the validity time of the following P-frame may be used to allow the P-frame's late delivery, which could help in the decoding of the next P-frame. Late delivery here can refer to delivery for example after the P-frame's PDB in case of transmission errors.

Figure 3:
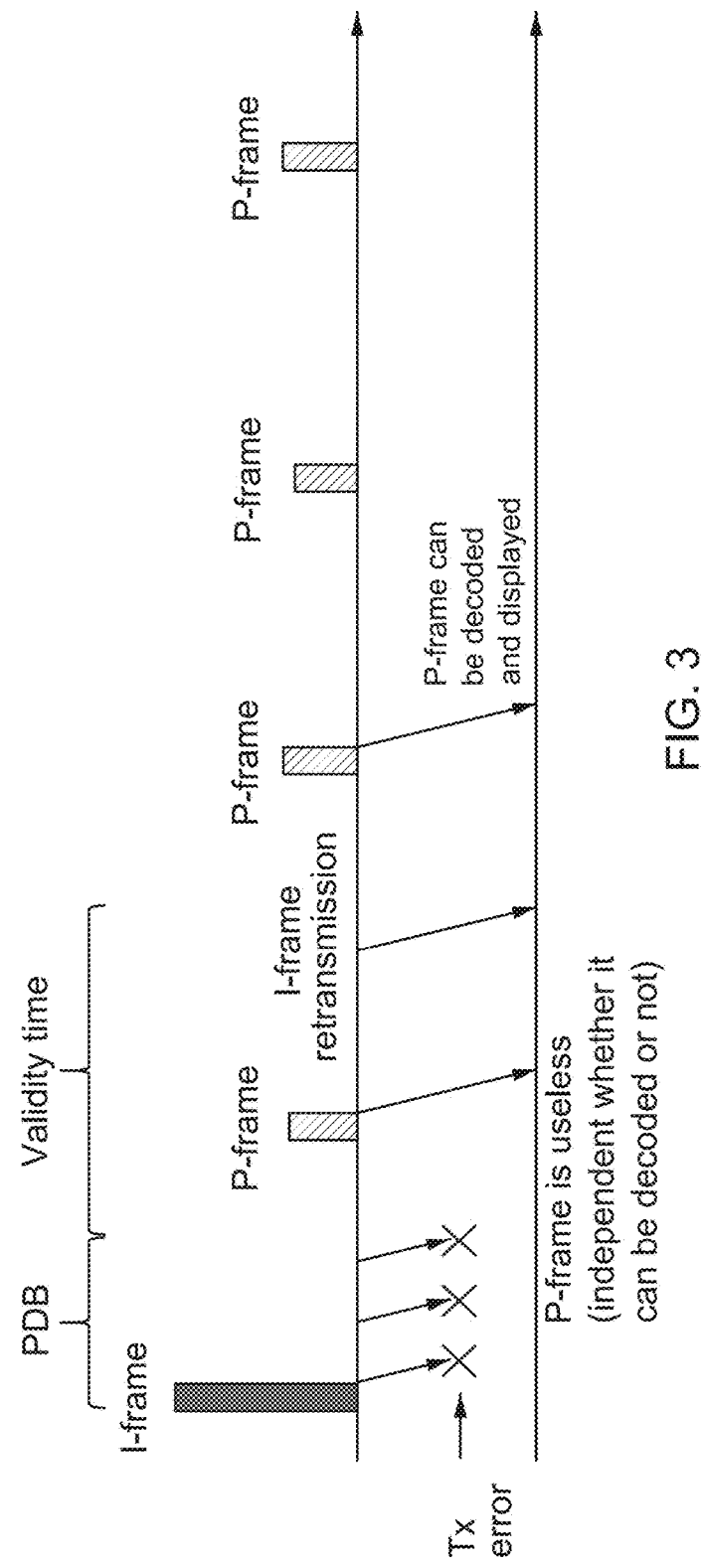
FIG. 3 illustrates an example of usage of validity time, according to certain embodiments.

FIG. 3 illustrates an example of usage of validity time, according to certain embodiments. FIG. 3 shows one example of usage of validity time where I-frame is re-transmitted after PDB, but within the validity time. An objective of re-transmission after PDB may be for the decoding of the following P-frames.

The validity time can be applied to one QoS flow, a single PDU, a PDU set that may include multiple PDUs, a subset of one QoS flow, or a media unit group. In the preceding discussion, there is a focus on the use cases with video traffic especially considering I-/P-frame, but the same principles can be applied to any type of traffic with layered coding, such as where there could be inter- and/or intra-layer dependency. Moreover, certain embodiments can be applied other types of services although XR has been used as one example to illustrate the principles of certain embodiments.

Certain embodiments may rely on a new QoS parameter, validity time, for XR and video packets, such as I-frame and P-frame. Any desired way of delivering QoS parameters from session management function to 5G RAN can be reused to deliver this new QoS parameter as well as, for example, during PDU session establishment phase. The validity time may have different values depending on the type of frame. Certain embodiments may be applied to high priority XR frame, but may be ignored in the case of low priority XR frames, such as P-frames. There are at least two different ways to carry the new QoS parameter. For example, the new QoS parameter can be added in a similar way as TSCAI/TSCAC, as described in section 5.27.2 of 3GPP TS 23.501. Thus, for example, validity time could be identified as assistance information. As another example, the validity time can be part of the QoS parameters indicated by one 5QI. The description of validity time could be that validity time refers to the latency window for XR packets carrying reference media units after PDB. For example, the description may indicate that the 5G-RAN should continue the delivery of XR packets until the end of validity time. Moreover, the description may indicate that the packets with an indicated validity time may only be dropped after the validity time indicated.

FIG. 4 illustrates a way of defining validity time for each 5G quality indicator (5QI), according to certain embodiments. As shown in FIG. 4, validity time can be added in a similar way as PDB for example, hence defining a new QoS parameter for each 5QI in Table 5.7.4-1 of Section 5.7 in 3GPP TS 23.501. Thus, FIG. 4 illustrates a new definition of Table 5.7.4-1, "Standardized 5QI to QoS characteristics mapping," from Section 5.7 in 3GPP TS 23.501. In 5G, a the resource type can determine allocation of dedicated network resources related to a particular quality of service flow-level guaranteed flow bit rate value. The resource types can include guaranteed bit rate, non-guaranteed bit rate, and delay-critical guaranteed bit rate. As the name suggests, the delay-critical guaranteed bit rate resources type is provided to address cases where a large amount of delay is undesirable.

Referring to FIG. 3, the packet validity time can be defined to start at the end of PDB. Alternatively, in another embodiment, the packet validity time can be defined from the start of PDB as well. There can be independence between the packet validity time and PDB, since the packet validity time and the PDB can be treated in different ways in a RAN node. To this end, there can be another QoS parameter used for controlling the (re)transmission time budget defined by the validity time for XR packets. From the application point of view, in case the I-frame can be successfully delivered within PDB, the I-frame will be decoded and displayed. However, the 5GS may fail to deliver the I-frame within the 5GS's PDB, for example due to scheduling delay and/or erroneous transmissions and/or congestions. Nevertheless, if the 5GS can successfully deliver the I-frame within the validity time, the delayed I-frame can still be used for the purpose of decoding the following P-frame(s), even if the I-frame itself is not rendered to the end user.

The value of validity time can be delivered to RAN side for efficiently handling the delivery of different XR packet types. In addition, the gNB can inform such information to UE via radio resource control (RRC) configuration signaling or lower layer signaling, for example a medium access control (MAC) control element (CE) when needed.

Packet validity time can indicate the duration of validity for a given packet of a QoS flow, a PDU set of a QoS flow, or all packets of a QoS flow to be delivered to a recipient, beyond which the packet may not be considered valid and thus can be safely discarded by a RAN node. PDB can, for a guaranteed bit rate (GBR) QoS flow using the delay-critical resource type, result in a packet delayed more than the PDB being counted as lost if the data burst does not exceed the maximum data burst volume (MDBV) within the period of PDB and the QoS flow does not exceed the guaranteed flow bit rate (GFBR). Furthermore, the delayed packet can be discarded if the packet has been delayed more than validity time for the given packet. However, as noted above, even if a packet can be discarded by a RAN node because the PDB has been exceeded, the packet validity time can lead to the RAN node retransmitting the packet after the PDB has been exceeded.

Figure 5:
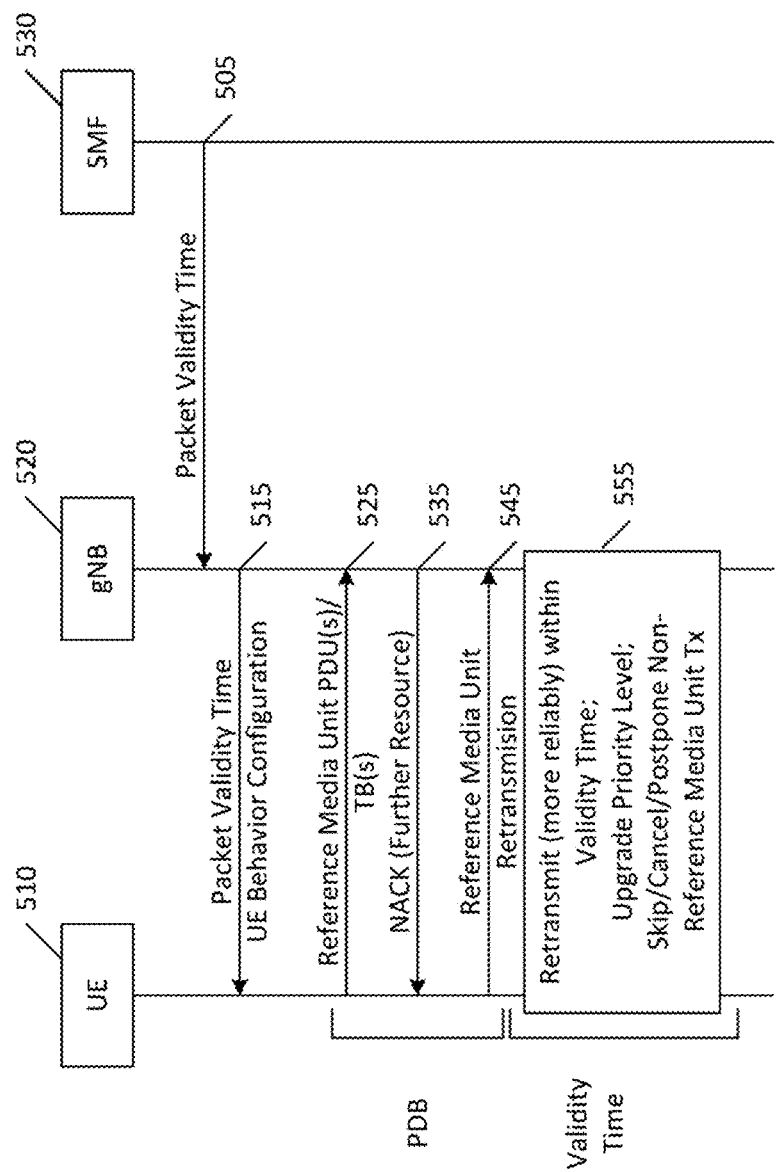
FIG. 5 illustrates a signal flow diagram of uplink operation, according to certain embodiments.

FIG. 5 illustrates a signal flow diagram of uplink operation, according to certain embodiments. FIG. 5 illustrates an example of scenarios with XR application, taking UL I-frame transmission as one example.

As shown in FIG. 5, gNB 520 can, at 505, receive packet validity time, for example I-frame validity time, information from the CN, for example SMF 530.

At 515, UE 510 can get the packet validity time, for example I-frame validity time, information from gNB 520 and gNB 520 can configure UE 510 behavior, such as dropping non-reference media units, such as P-frame(s), before getting explicit or implicit confirmation of previous non-reference media unit, for example an I-frame, being received correctly.

At 525, UE 510 can transmit a reference media unit, for example an I-frame, PDU(s)/TB(s) with the configured resource with the assumption that UL configured grant (CG) can be used for reference media unit, for example I-frame, transmission due to the periodic traffic arrival.

At 535, if not all UL reference media unit, for example I-frame, PDU(s)/TB(s) can be successfully delivered within PDB, gNB 520 can optionally negatively acknowledge receipt and allocate some new resource for retransmission. At 545, UE 510 can continue UL re-transmission of the erroneous reference media unit, for example I-frame, PDU(s)/TB(s) with new resource allocated by gNB 520 within the validity time or using an existing configured resource. During this time, transmission of non-reference media unit, for example P-frame, can be skipped or postponed, if configured by gNB 520 and if enough PDB is left.

After PDB, at 555 the reference media unit, for example I-frame, PDU(s)/TB(s) can be handled by UE 510 and gNB 520 as higher priority traffic in a RAN protocol that may impact intra-UE prioritization. For example, UE 510 can more reliably retransmit with a validity time, upgrade a priority level at either MAC and/or PHY layer, and skip, cancel, or postpone non-reference media unit, for example, P-frame, transmission until reference media unit, for example, I-frame, TB(s) can be correctly received.

Figure 6:
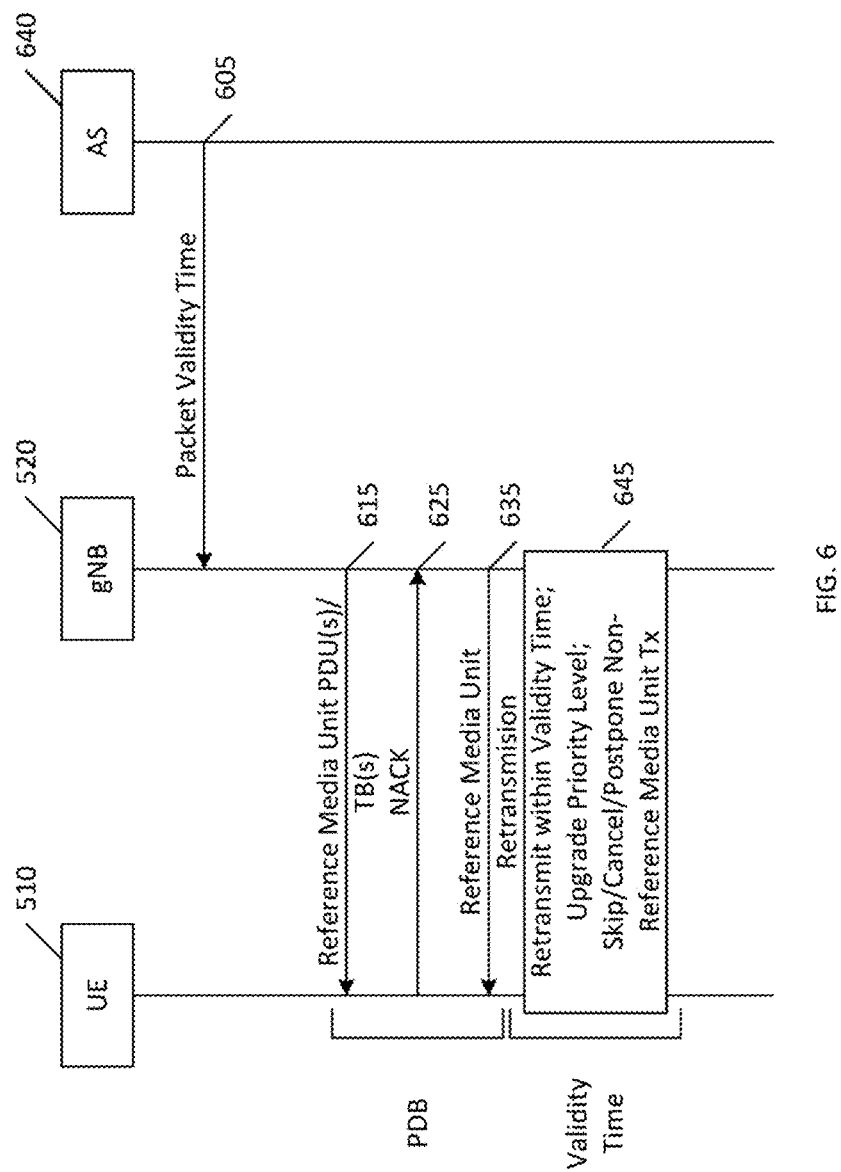
FIG. 6 illustrates a signal flow diagram of downlink operation, according to certain embodiments.

FIG. 6 illustrates a signal flow diagram of downlink operation, according to certain embodiments. As shown in FIG. 6, gNB 520 may be informed at 605 of packet validity time, for example an I-Frame validity time, from the core network, for example from application server (AS) 640 or an SMF as in FIG. 5.

At 615, gNB 520 can send reference media units, for example I-Frame PDUs and/or TBs, to UE 510. Transmission of I-frame PDU(s)/TB(s) according PDB may occur, for example, with configured semi-persistent scheduling (SPS).

The UE 510 may negatively acknowledge receipt at 625. Then, at 635, the gNB 520 can attempt retransmission during the PDB.

At 645, after PDB, the gNB 520 can continue reference media unit, for example I-frame, transmissions within the validity time and can set them as high priority instead of flushing the buffer. Nevertheless, gNB 520 can discard the reference media unit, for example I-frame, PDU after the validity time. At gNB 520, there can also be holding/dropping the transmissions of non-reference media unit, for example P-frame, PDU(s)/TB(s) before successfully delivering the reference media unit, such as I-frame. There may be an improved UE 510 power efficiency in case the behavior is configured to UE 510 beforehand. For example, UE 510 does not need to decode the P-frame resource. On the other hand, in certain embodiments, the procedures can be operated almost in UE transparent manner from radio other than configuring validity time.

Figure 7:
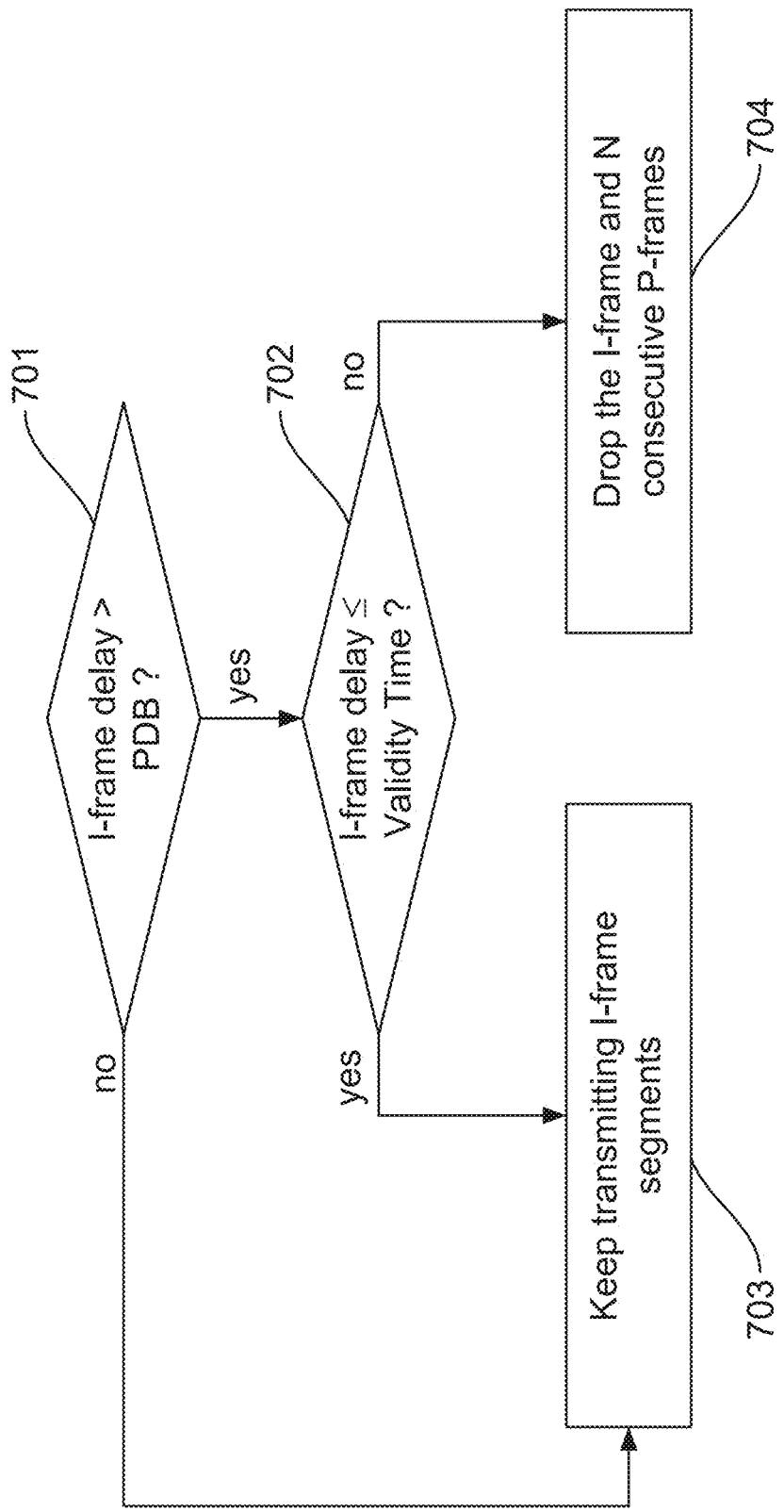
FIG. 7 illustrates procedures for handling downlink transmission of reference media units, according to certain embodiments.

FIG. 7 illustrates procedures for handling downlink transmission of reference media units, according to certain embodiments. For example, FIG. 7 illustrates certain embodiments relating to a possible procedure for handling DL transmission of I-frames of an XR stream. An XR stream can refer to the provision of XR video at a data rate that is designed to be received and viewed as it is received, rather than being stored and viewed at a later time. Sometimes this approach is referred to as live streaming, although the XR video may originate from storage media rather than from a live video source. It should be understood that in FIG. 7, I-frame is provided as an example of a reference media unit, and P-frame is provided as an example of a non-reference media unit.

As shown in FIG. 7, at 701 there can be a determination as to whether I-frame delay exceeds PDB. If no, then the transmitting unit, which may be a gNB can keep transmitting or retransmitting I-frames at 703. Otherwise, if PDB has been exceeded, then at 720 the transmitting unit can determine whether I-frame validity time is not yet exceeded. If the I-frame validity time is not exceeded then at 703 the transmitting unit can continue (re-)transmitting the I-frames. Otherwise, at 704, the transmitting unit can drop the I-frame as well as N consecutive P-frames. The value of N can depend on the pattern of I-frames and N-frames. In the examples of FIGS. 2 and 3, the value of N may be four.

Figure 8:
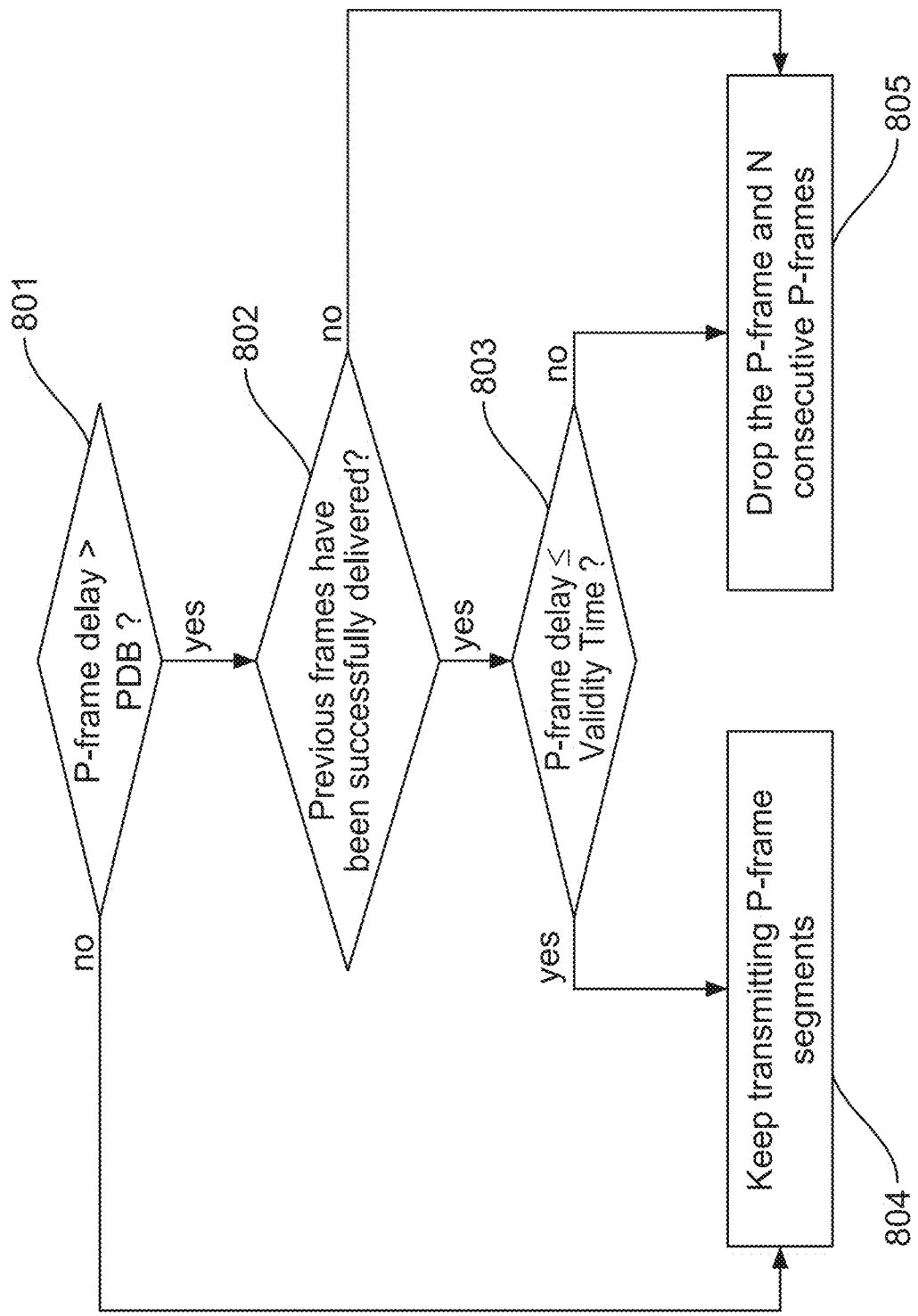
FIG. 8 illustrates procedures for handling downlink transmission of non-reference media units, according to certain embodiments.

FIG. 8 illustrates procedures for handling downlink transmission of non-reference media units, according to certain embodiments. For example, FIG. 8 illustrates certain embodiments relating to a possible procedure for handling DL transmission of packets of a QoS flow where each packet contains a P-frame that is part of an XR stream by a radio access network node (e.g. a gNB). It should be understood that in FIG. 8, I-frame is provided as an example of a reference media unit, and P-frame is provided as an example of a non-reference media unit.

As shown in FIG. 8, at 801 there can be a determination of whether P-frame delay exceeds PDB. If not, then at 804 the transmitting unit, which can be part of a gNB, can keep transmitting or re-transmitting P-frames. Otherwise, a determination can be made at 802 as to whether previous frames have been successfully transmitted to a UE. If not, the P-frame and N consecutive P-frames can be dropped at 805. This may be a different value of N from the example in FIG. 7, but may similarly depend on the transmission pattern. For example, if the P-frame in question is normally followed by three P-frames, like the first P-frame in FIGS. 2 and 3, then N can be 3. If previous frames were successfully delivered, then at 803 the gNB or other transmitting unit can determine whether the P-frame delay has not exceeded a validity time. If the validity time has not been exceeded, then at 805 the transmitting unit can continue (re)transmitting P-frames. Otherwise, the transmitting unit can drop the P-frame and N consecutive P-frames at 805.

Thus, FIGS. 7 and 8 show the flowcharts of two possible procedures for handling the DL transmission of I-frames and P-frames, respectively. The value of the packet validity time for I-frame and P-frame can differ so as to capture the priority of the frame type. The number N of consecutive frames to be discarded when a frame cannot be delivered within the PDB and validity time (procedures 704 and 805) can be configured through RRC signaling for example.

Figure 9:
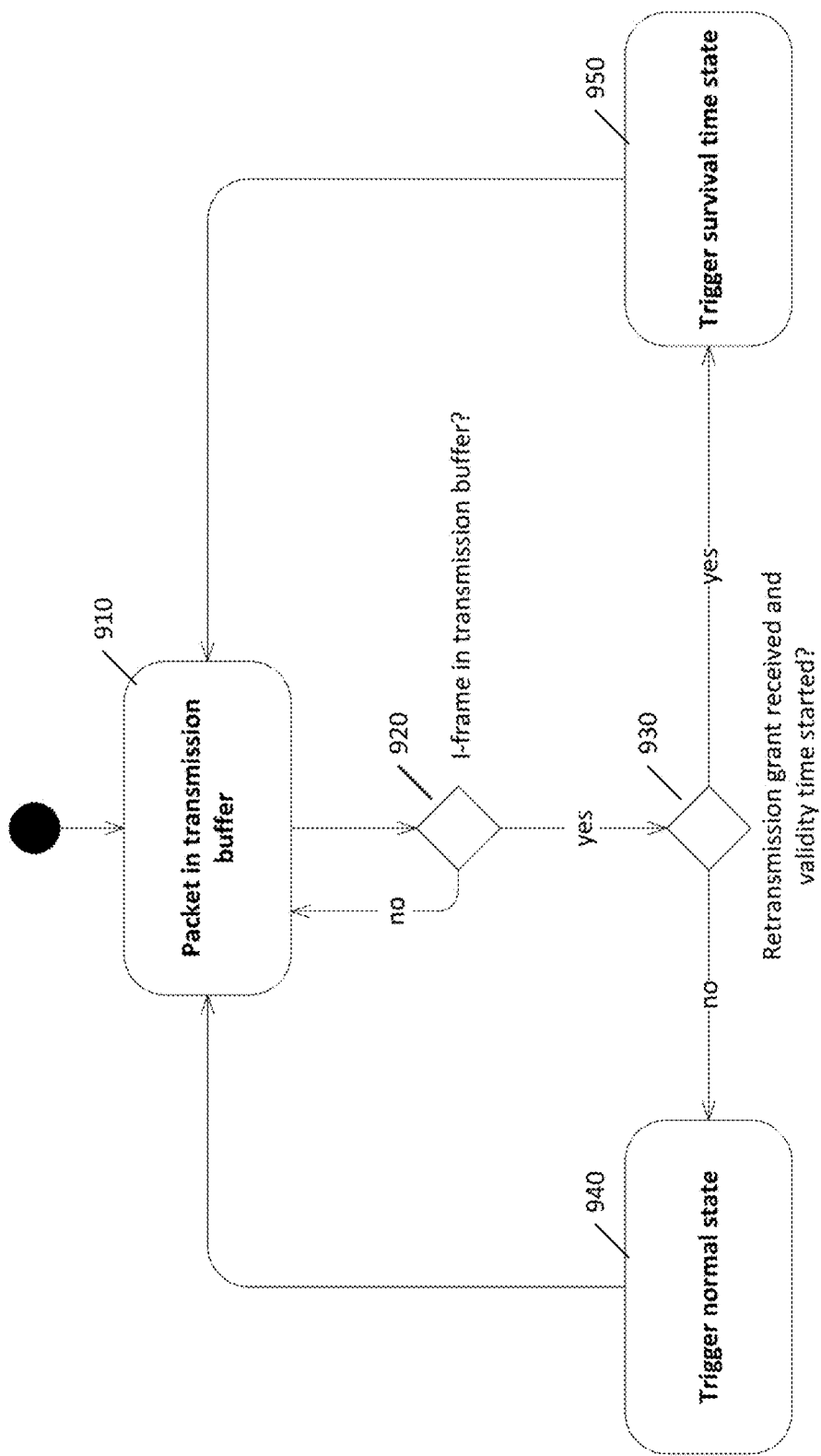
FIG. 9 illustrates survival time state triggering, according to certain embodiments.

FIG. 9 illustrates survival time state triggering, according to certain embodiments. At 910, a packet can be in a transmission buffer. At 920, a determination can be made about whether it is an I-frame in the transmission buffer. If not, the state can revert to 910. Otherwise, at 930, a determination can be made about whether a retransmission grant has been received and a validity time has been started. If both are not true, then at 940 a normal state can be triggered and the state can return to 910. If both are true, though, then at 950, a survival time state can be triggered, before the state returns to 910.

When survival time information is provided in a TSCAI or a TSCAC, RAN action as to the gNB and/or UE can utilize the provided survival time information to improve the associated link reliability so that the survival time requirements are fulfilled. Survival time may not apply to XR traffic as for URLLC, where the aim may be to boost reliability of subsequent transmissions in order to avoid consecutive failures. However, similarly survival time state could be triggered in order to boost reliability of current I-frame (re-)transmissions that are violating PDB, but would be essential for shortly upcoming P-frames.

In certain embodiments, if both survival time and validity time are set for one data radio bearer (DRB), then survival time can be triggered if validity time is started and maintained during the validity time. Hence, survival time, which may trigger packet duplication in 5G-NR release 17 (Rel-17), may be started only if validity time is entered for erroneous transmission. This would allow saving of radio resources by not instantly triggering survival time, and further boosting reliability only if absolutely needed for maintaining QoS for XR. Thus, an I-frame packet for which retransmission grant is received could trigger survival time once validity time is triggered.

Taking the example of video traffic discussed above, survival time state could be also utilized for improving reliability of ongoing I-frame transmissions when P-frames are becoming useless due to unsuccessful I-frame. Survival time state can be used, for example, for quickly activating additional pre-configured radio link control (RLC) entities for packet duplication and/or pre-configured radio resources for I-frame PDU transmissions as depicted in FIG. 9. Such an approach may allow a UE to quickly perform additional I-frame transmissions in case of an error and save subsequent P-frames.

Thus, FIG. 9 illustrates survival time state triggering when validity time is configured in addition to survival time. Survival time may only be triggered if validity time is being started, for example when PDB is exceeded, and retransmission grant is also received.

Figure 10:
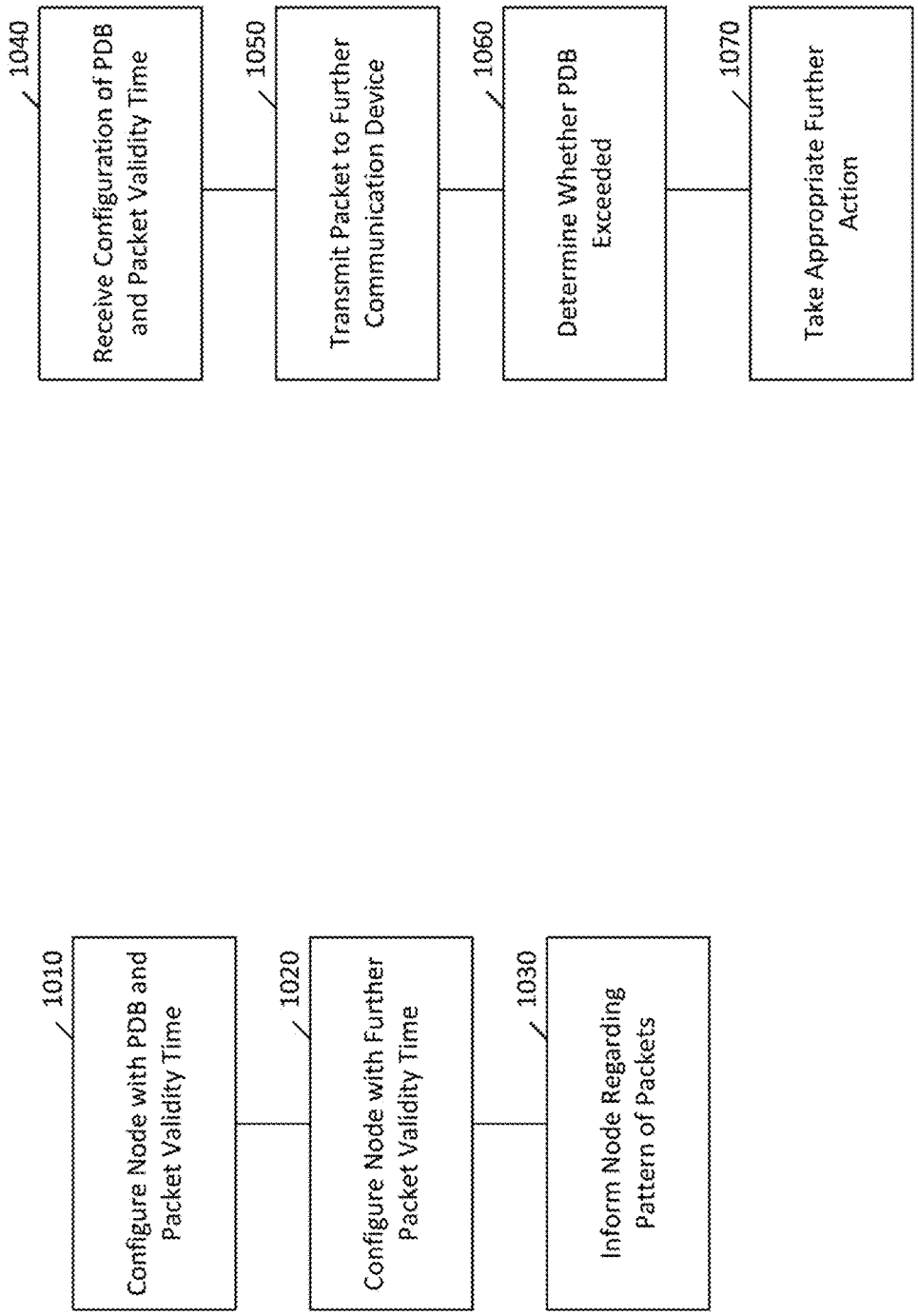
FIG. 10A illustrates a method according to certain embodiments.
FIG. 10B illustrates a method according to certain embodiments.

FIG. 10A illustrates a method according to certain embodiments. As shown in FIG. 10A, a method can include, at 1010, configuring a network node with a plurality of quality of service parameters for first packet-based communication. For example, a quality of service configuration can be provided.

The plurality of quality of service parameters can include a packet delay budget for the first packet-based communication having a first end time associated with a packet of the first packet-based communication. The parameters can also include a packet validity time for the first packet-based communication defining having a second end time associated with the packet of the first packet-based communication, Thus, the packet delay budget and packet validity time can be applicable to a same packet.

The packet validity time can be applicable to the first packet-based communication on a protocol data unit session basis, a quality of service flow basis, a set of protocol data units basis, or a packet basis. The second end time can be equal to or later than the first end time.

A packet of the first packet-based communication can be a reference media unit. For example, the first packet-based communication can be an I-frame as discussed above.

The method can also include, 1020, configuring the network node with further quality of service parameters for second packet-based communication. The further quality of service parameters can be in a further quality of service configuration. The parameters can include a further packet validity time having a third end time associated with a further packet of the second packet-based communication. The second end time can be later than the third end time. The further quality of service parameters can be applicable to the second packet-based communication on a protocol data unit session basis, a quality of service flow basis, a set of protocol data units basis, or a packet basis.

The further packet can be a non-reference media unit. For example, the further packet can be a P-frame or a B-frame.

The packet validity time can have a start time at or after the first end time. Alternatively, the packet validity time can have a common starting time with the packet delay budget.

The configuring at 1010 or 1020 can include sending a quality of service identifier to the network node. The packet validity time can be identifiable from the quality of service identifier. Alternatively, the configuring at 1010 or 1020 can include sending assistance information comprising an indication of the packet validity time.

The method can include, at 1030, informing the network node regarding a pattern of reference media units to non-reference media units, wherein the packet comprises one reference media unit of the pattern of reference media units. This information may allow the network node to determine whether to apply the packet validity time or the further packet validity time to a given packet.

The network node can be a core network function, a radio access network node, or a user equipment.

FIG. 10B illustrates a method according to certain embodiments. The method of FIG. 10A may be used alone or in combination with the method of FIG. 10B.

As shown in FIG. 10B, a method can include, at 1040, receiving a quality of service configuration for first packet-based communication. The quality of service configuration can include a plurality of quality of service parameters. The plurality of quality of service parameters can include a packet delay budget for the first packet-based communication having a first end time associated with a packet of the first packet-based communication. The plurality of quality of service parameters can further include a packet validity time for the first packet-based communication having a second end time associated with the first packet-based communication. The quality of service configuration can be applicable to the first packet-based communication on a protocol data unit session basis, a quality of service flow basis, a set of protocol data units basis, or a packet basis. The second end time can be equal to or later than the first end time.

At 1050, the method can include transmitting the packet of the first packet-based communication to a further communication device. For example, the packet can be transmitted from a RAN node to a UE, or from a UE to the RAN node.

A packet of the first packet-based communication can be a reference media unit. For example, as mentioned above, the packet can be an I-frame.

The method can also include, at 1060, determining whether the packet delay budget for the packet is exceeded. The method can further include, at 1070, taking an appropriate further action. For example, the further action can include retransmitting the packet to the further communication device when the packet validity time for the packet is not exceeded.

When the packet validity time is exceeded, the appropriate further action can include discarding the packet, delivering the packet with low priority, indicating to a network node that the packet validity time is exceeded with respect to the packet, or any suitable combination thereof.

The appropriate further action may be to upgrade a priority level of the transmission of the packet based on the packet delay budget of the packet being exceeded and the packet validity time of the packet not being exceeded.

The appropriate further action may be to delay transmission of at least one non-reference media unit following the reference media unit based on the packet delay budget being exceeded and the packet validity time not being exceeded.

FIG. 11 illustrates an example of a system that includes an apparatus 10, according to an embodiment. In an embodiment, apparatus 10 may be a node, host, or server in a communications network or serving such a network. For example, apparatus 10 may be any device in a network, such as a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 11.

As illustrated in the example of FIG. 11, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 11, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 3-9, or any other method described herein. In some embodiments, as discussed herein, apparatus 10 may be configured to perform a procedure relating to enhancement of quality of service flows, for extended reality services or other services, for example.

FIG. 11 further illustrates an example of an apparatus 20, according to an embodiment. In an embodiment, apparatus 20 may be or may represent any node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 11.

As illustrated in the example of FIG. 11, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, the apparatus 20 may be or may be a part of a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 3-9, or any other method described herein. For example, in an embodiment, apparatus 20 may be controlled to perform a process relating to enhancement of quality of service flows, for extended reality services or other services, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may help gNB to control queuing delay, for example discarding the packets that exceed PDB and validity time. Certain embodiments may provide an efficient way, taking XR service as example, to avoid dropping all the following P-frames once an I-frame is not correctly received within PDB. Certain embodiments may reduce the number of lost frames. For example, if an I-frame is not received within the PDB it may be considered lost. In this case all following P-frames may also be lost, since the decoding of P-frames may depend on the lost I-frame. Certain embodiments may prevent the loss of a burst of frames simply due to the transmission error of a single I-frame, thereby boosting end-user experience.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

5GS 5G system
AN Access network
AR Augmented Reality
CG Configured Grant
CN Core network
DL Downlink
E2E End-to-end
FoV Field of View
gNB Next generation nodeB
GoP Group of Pictures
HARQ Hybrid ARQ
IIoT Industrial Internet of Things
MR Mixed Reliability
NR New radio
PDB Packet Delay Budget PDU Protocol Data Unit
QoS Quality of service
SPS Semi Persistent Scheduling
TB Transport Block
TSC Time sensitive communication
TSCAI TSC Assistance Information
TSCAC TSC Assistance Container
UE User Equipment
UL Uplink
UPF User plane function
URLLC Ultra-Reliable Low-Latency Communications
VR Virtual Reality
XR Extended Reality

We claim:

1. An apparatus, comprising:
at least one processor; and
at least one memory including computer program instructions,
wherein the at least one memory and the computer program instructions are configured to, with at least one processor, cause the apparatus at least to perform
configuring a network node of a communication system with a plurality of quality of service parameters for a first packet-based communication,
the plurality of quality of service parameters comprising a packet delay budget for the first packet-based communication having a first end time associated with a packet of the first-packet based communication and a packet validity time for the first packet-based communication having a second end time associated with the packet of the first-packet based communication,
wherein the packet validity time indicates a duration of validity for the packet beyond which the packet is discarded by the network node;
wherein the packet validity time for the first packet-based communication is applicable on a protocol data unit session basis, a quality of service flow basis, a set of protocol data units basis, or a packet basis, and
wherein the second end time is equal to or later than the first end time.

2. The apparatus of claim 1, wherein a packet of the first packet-based communication comprises a reference media unit.

3. The apparatus of claim 2, wherein the at least one memory and the computer program instructions are configured to, with at least one processor, cause the apparatus at least to further perform
configuring the network node with further quality of service parameters for a second packet-based communication,
the further quality of service parameters comprise a further packet validity time having a third end time associated with a further packet of the second packet-based communication,
wherein the second end time is later than the third end time,
wherein the further packet validity time indicates a duration of validity for the further packet beyond which the packet is discarded by the network node;
wherein the further packet validity time for the second packet-based communication is applicable on a protocol data unit session basis, a quality of service flow basis, a set of protocol data units basis, or a packet basis, and
wherein the further packet comprises a non-reference media unit.

4. The apparatus of claim 1, wherein the packet validity time has a start time at or after the first end time.

5. The apparatus of claim 1, wherein the packet validity time has a common starting time with the packet delay budget.

6. The apparatus of claim 1, wherein the configuring comprises sending a quality of service identifier to the network node, wherein the packet validity time is identifiable from the quality of service identifier.

7. The apparatus of claim 1, wherein the configuring comprises sending assistance information comprising an indication of the packet validity time.

8. The apparatus of claim 1, wherein the at least one memory and the computer program instructions are configured to, with at least one processor, cause the apparatus at least to perform
informing the network node regarding a pattern of reference media units to non-reference media units, wherein the packet comprises one reference media unit of the pattern of reference media units.

9. The apparatus of claim 1, wherein the network node comprises a core network function, a radio access network node, or a user equipment.

10. An apparatus, comprising:
at least one processor; and
at least one memory including computer program instructions,
wherein the at least one memory and the computer program instructions are configured to, with at least one processor, cause the apparatus at least to perform
receiving a plurality of quality of service parameters for first packet-based communication, the plurality of quality of service parameters comprising a packet delay budget for the first packet-based communication having a first end time associated with a packet of the first packet-based communication, wherein the plurality of quality of service parameters further comprises a packet validity time for the first packet-based communication having a second end time associated with the packet of the first packet-based communication, wherein the packet validity time indicates a duration of validity for the packet beyond which the packet is discarded by a network node, wherein the packet validity time for the first packet-based communication is applicable on a protocol data unit session basis, a quality of service flow basis, a set of protocol data units basis, or a packet basis, and wherein the second end time is equal to or later than the first end time; and
transmitting the packet of the first packet-based communication to a further communication device.

11. The apparatus of claim 10, wherein the at least one memory and the computer program instructions are configured to, with at least one processor, cause the apparatus at least to perform
determining whether the packet delay budget for the packet is exceeded; and
retransmitting the packet to the further communication device when the packet validity time for the packet is not exceeded.

12. The apparatus of claim 11, wherein the at least one memory and the computer program instructions are configured to, with at least one processor, cause the apparatus at least to perform an action on the packet when the packet validity time is exceeded, the action comprising:
discarding the packet;
delivering the packet with low priority; or indicating to a network node that the packet validity time is exceeded with respect to the packet.

13. The apparatus of claim 11,
wherein the at least one memory and the computer program instruction are configured to, with at least one processor, cause the apparatus at least to
upgrade a priority level of the transmission of the packet based on the packet delay budget of the packet being exceeded and the packet validity time of the packet not being exceeded.

14. The apparatus of claim 11, wherein the at least one memory and the computer program instruction are configured to, with at least one processor, cause the apparatus at least to
delay transmission of at least one non-reference media unit following the reference media unit based on the packet delay budget being exceeded and the packet validity time not being exceeded.

15. The apparatus of claim 10, wherein a packet of the first packet-based communication comprises a reference media unit.

16. The apparatus of claim 15, wherein the at least one memory and the computer program instructions are configured to, with at least one processor, cause the apparatus at least to further perform
receive further quality of service parameters for second packet-based communication,
the further quality of service parameters comprise a further packet validity time having a third end time associated with a further packet of the second packet-based communication,
wherein the further packet validity time indicates a duration of validity for the further packet beyond which the packet is discarded by the network node;
wherein the second end time is later than the third end time,
wherein the further packet validity time for the second packet-based communication is applicable on a protocol data unit session basis, a quality of service flow basis, a set of protocol data units basis, or a packet basis, and
wherein the further packet comprises a non-reference media unit.

17. The apparatus of claim 10, wherein the packet validity time has a start time at or after the first end time.

18. The apparatus of claim 10, wherein the packet validity time has a common starting time with the packet delay budget.

19. The apparatus of claim 10, wherein the receiving comprises receiving a quality of service identifier, wherein the packet validity time is identifiable from the quality of service identifier.

* * * * *